Patented June 9, 1931

1,809,082

UNITED STATES PATENT OFFICE

JOSEPH URKOV AND BENJAMIN R. HARRIS, OF CHICAGO, ILLINOIS; SAID URKOV ASSIGNOR TO EPSTEIN & HARRIS, OF CHICAGO, ILLINOIS, A COPARTNERSHIP CONSISTING OF ALBERT K. EPSTEIN AND BENJAMIN R. HARRIS

PRODUCT FOR TREATING THE SKIN

No Drawing. Application filed May 4, 1927. Serial No. 188,863.

Our invention relates to a product for treating the skin, an object being to produce such treatment and product, useful for healing and improving the appearance of the skin, and particularly the skin of the face, the neck, and other exposed portions, the appearance of which it is usually desirous to improve.

One of the features of our invention is the method of treating the skin by the application of a plastic or paste-like product which readily transforms itself into a continuous rubbery sheet (when exposed to room temperature) which may be pulled off as a whole or in sections, leaving the skin clean and free of objectionable residue. Another feature of our invention is in the provision of a product of the above character which serves the same and additional purposes as massage creams but does not have the greasy and unpleasant characteristics of such creams. There are other features and these will be more particularly apparent from the ensuing portion of the specification and appended claims.

Referring now more in general to our method of treating the skin and product for use in the same, we preferably provide a product which may be applied to the face or that part of the skin surface which is to be treated, in the form of a semi-fluid or plastic paste which after being applied will set sufficiently within a reasonably short time so that it may be removed in a continuous sheet, or continuous sections leaving the skin clean and free of the product.

Our improved method has certain advantages in administering various substances to the skin, in contradistinction to the older methods, which may be characterized by ointments or lotions. In these prior methods of medication, the entire substance of the ointment or the lotion is allowed to remain on the skin in its original condition, which, in some instances, is undesirable, whereas, in our method, after applying and allowing our preparation to set and act, we can then, without difficulty, remove all the material applied and with it substances foreign to the skin. When this is done, the desired action of the agents in question has been exerted but no foreign material of objectionable nature is allowed to remain.

Different skin conditions which may be treated are various dermitites and erythemas, and more particularly, such conditions as acne, eczema, scabies, psoriasis, the medicinal agent selected and incorporated in our composition depending upon the condition treated and the dosage required. This rests largely with the physician who may have special cases to treat.

However, even under normal circumstances, when the skin is in a healthy condition, we find that our preparation can be used with benefit, for it tends to enter the superficial openings of the pores or other small blemishes and cleanse them by removing foreign substances therefrom, and supplying to them glycol, oleaginous material or other beneficial ingredients, and subjecting them to the beneficial action of other active ingredients of the product.

In the preparation of our product, we preferably employ some substance that may be warmed or otherwise acted upon to reduce it to a plastic or semi-fluid state for ready application to the skin and then will change to a continuous rubbery sheet for ready removal, and to this end we use a gelatin base intermixed with the other ingredients to be employed. The preferred product includes principally a gelatinized hydrophylic colloid, water, a suitable oleaginous material, a white opacifying agent, such as zinc oxide or titanium oxide, zinc stearate, zinc borate, zinc carbonate; and if desired, a suitable medicinal agent, such as tar, chrysarobin, ammoniated mercury, sulphur, oil of cade, or others. The zinc compounds themselves, besides functioning as opacifying agents, also act therapeutically principally as astringents.

As a colloid we preferably employ high-grade commercial gelatine but do not limit ourselves to this as gum arabic, casein, agar-agar and similar products may be used.

As an opacifying agent we preferably employ an astringent such as zinc oxide, but it is to be understood that the opacifying agent may be omitted and if an astringent is desired, a substance such as alcohol may be used which is transparent. And as to an oleaginous material, castor oil has been found very suitable but this may be omitted or used according to the treatment or results desired.

In the preparation of our product, we preferably employ such proportions as produce a mixture which when dispensed in small cans or collapsible tubes of a sufficient quantity to cover the face, will soften in a reasonably short time, by placing the container in warm water, say 4 or 5 minutes and be reduced to a semi-fluid or plastic state to be readily applicable to the skin surface. Also it must be preferably of such consistency that after being softened in hot water, will remain in its plastic state at room temperature for a sufficient length of time to permit removal from the container and application to the face before returning to its normal or rubbery-like state. Also it should be preferably of such consistency that after being applied to the face it will set sufficiently within a reasonably short time, say ten to fifteen minutes, so that it may be readily removed either as a continuous sheet or in small continuous sheet sections. This will depend somewhat upon the care taken in removing it. Also the product should be such that it will have such pliability and elasticity that it will readily conform to the irregularities of the skin surface and have such a rubbery-like characteristic as will cause it to hold together when pulled off of the skin.

For the purpose of illustration we set out herein a very suitable formula, but of course contemplate producing the product in other ways than hereinafter set out, the following being a desirable and preferred formula:—

| | |
|---|---|
| High-grade commercial gelatine | 100 grammes |
| Water | 350 grammes |
| Zinc oxide | 85 grammes |
| Ethylene glycol | 50 cc. |
| Castor oil | 50 cc. |
| Menthol | .75 grammes |
| Perfume | sufficient quantity to give desired result. |

In the preparation of the product we allow the gelatine to soak in the amount of water specified, at room temperature. We then melt the mixture in a steam bath and add the other ingredients with sufficient stirring to produce a homogeneous preparation, usually about one-half hour for above quantity. Also the product may be colored or perfumed so as to give it more pleasant and desirable characteristics. Also, to positively avoid deterioration by bacteria, yeast or molds, a small amount of sodium benzoate or a similar preservative agent may be added, say ½ of 1%. The product is then poured into small tin cans or collapsible metal tubes and allowed to set.

When it is desired to make an application, the tube or can is placed in warm water, until the content is viscous and flows, or reduced to a sufficiently plastic state to be readily applied. It is then applied in a thin layer to the face or the skin surface which is to be treated, allowed to set fifteen to thirty minutes, and then pulled off as a sheet.

For some therapeutic purposes, such as in skin bleaching, it is desirable to retain the solidified sheet in contact with the skin for much longer periods, that is, for thirty minutes or more, and then removed.

What we claim as new and desire to secure by United States Letters Patent is:

1. A product for treating the skin including substantially proportionately 100 350 grammes of water, 85 grammes of zinc oxide, 50 cc. of ethylene glycol and 50 cc. of castor oil, intermixed to produce a homogeneous plastic mass and poured into suitable containers for dispensing.

2. A rubber like product for treating the skin including a gelatinized hydrophylic colloid and water, zinc oxide, ethylene glycol and castor oil.

3. A rubber like product for treating the skin including a gelatinized hydrophylic colloid and water, zinc oxide and a softening agent.

4. A rubber like product for treating the skin including a gelatinized hydrophylic colloid and water, a solid filler and a softening agent.

5. A rubber like product for treating the skin including a gelatinized hydrophylic colloid, a solid filler and oleaginous matter.

6. A rubber like product for treating the skin including a high grade commercial gelatin, water, zinc oxide, ethylene glycol and castor oil combined in proportions to produce a mixture which when applied in a thin layer in a warm plastic state to the skin of the face or surface to be treated will give sufficient time for application before setting to a rubber like sheet and remain sufficient elastic when cool to permit pulling it off the skin in substantially continuous sheet sections.

7. A rubber like product for treating the skin including a high grade commercial gelatin, water, zinc oxide, ethylene glycol and castor oil.

8. A facial composition, comprising gelatin in solution, zinc oxide, castor oil and a polyhydroxy alcohol, the composition being plastic and adapted to be removed from the skin by stripping.

In witness whereof, we hereunto subscribe our names this first day of April, 1927.

JOSEPH URKOV.
BENJAMIN R. HARRIS.